United States Patent
Han et al.

(10) Patent No.: US 10,064,017 B2
(45) Date of Patent: Aug. 28, 2018

(54) CHARACTERIZING AND USING BUILDING WEATHER PROFILE PARAMETERS

(71) Applicant: NextNav, LLC, Sunnyvale, CA (US)

(72) Inventors: Guiyuan Han, San Jose, CA (US);
Michael Dormody, San Jose, CA (US);
Thomas Wolf, Mountain View, CA (US); Ganesh Pattabiraman, Saratoga, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/487,215

(22) Filed: Apr. 13, 2017

(65) Prior Publication Data

US 2017/0223509 A1    Aug. 3, 2017

Related U.S. Application Data

(60) Provisional application No. 62/351,814, filed on Jun. 17, 2016.

(51) Int. Cl.
*H04W 4/04* (2009.01)
*G01W 1/06* (2006.01)
*G01C 5/00* (2006.01)

(52) U.S. Cl.
CPC ............ *H04W 4/04* (2013.01); *G01C 5/00* (2013.01); *G01W 1/06* (2013.01)

(58) Field of Classification Search
None
See application file for complete search history.

(56) References Cited

U.S. PATENT DOCUMENTS

| | | | |
|---|---|---|---|
| 2014/0200846 A1* | 7/2014 | Wachter | G01C 5/06 702/138 |
| 2015/0142179 A1* | 5/2015 | Ito | F24F 11/001 700/276 |
| 2015/0241213 A1* | 8/2015 | Garin | G01C 5/005 73/384 |
| 2017/0280301 A1* | 9/2017 | Chang | H04W 4/043 |

* cited by examiner

*Primary Examiner* — Frantz Bataille
(74) *Attorney, Agent, or Firm* — Kyle M. Pendergrass

(57) ABSTRACT

Determining building weather profile parameters, and correcting an estimated altitude of a receiver using the building weather profile parameters. Systems and methods for estimating an altitude of a receiver using building weather profile parameters may identify one or more weather profile parameters for a building, determine an initial estimate of a receiver's altitude at a floor inside the building, and use the initial estimate and the identified weather profile parameters to determine a corrected estimate of the receiver's altitude at the floor.

24 Claims, 10 Drawing Sheets

For each of N different altitudes in a building, determine a difference in indoor and outdoor pressures and a difference in inverted indoor and outdoor temperatures at that altitude (413)

Determine an expected outdoor pressure and an expected outdoor temperature corresponding to the altitude of an identified floor (613a)

Determine a difference between the expected outdoor pressure and the indoor pressure for the floor (613b)

Determine a difference between the inverted outdoor temperature and the inverted indoor temperature for the floor (613c)

Repeat 613a-613c for different floors/altitudes (613d)

FIG. 6

CHARACTERIZING AND USING BUILDING WEATHER PROFILE PARAMETERS

BACKGROUND

Determining the exact location of a receiver in an environment can be quite challenging, especially when the receiver is located within a building. Imprecise estimates of the receiver's position may have "life or death" consequences for the user. For example, an imprecise estimated position of a mobile phone operated by a user calling 911 can delay emergency personnel response times. In less dire situations, imprecise estimates of the user's position can negatively impact efforts to provide navigation to a desired destination or status updates regarding the user's location.

Estimates of a receiver's latitude and longitude can be computed using known techniques, and later used to identify a building in which the receiver is located. An estimate of a receiver's altitude can also be computed using known techniques, and later used to identify a floor of that building at which the receiver is located. One known approach for estimating the altitude of a receiver relates pressure measured by the receiver with pressure at a known height. Unfortunately, the pressure measured at the position of the receiver inside the building may not be the same as the ambient pressure at the same altitude outside the building. Such pressure discrepancies are due to the stack effect and building pressurization from heating, ventilation and air-conditioning (HVAC) systems. These pressure discrepancies may change over the course of seasons as the HVAC system heats or cools the building. These pressure discrepancies result in estimates of altitude that deviate from the actual altitude of the receiver. In order to accurately map the receiver's altitude to a floor of a building, the precision of the receiver's estimated altitude must be within an acceptable vertical range. For instance, in a building that has a 3 meter separation between each floor, a deviation of 3 meters from the receiver's true altitude could send emergency responders to the wrong floor. Thus, solutions are needed to identify and correct for indoor pressure discrepancies in order to estimate altitudes with desired accuracy.

BRIEF DESCRIPTION OF THE DRAWINGS

FIG. 6 illustrates one embodiment for determining differences in indoor and outdoor pressure and temperature at different altitudes of the building.

DETAILED DESCRIPTION

Approaches using a measured pressure at the location of a receiver to generate an estimated altitude of the receiver are well known in the art. Due to the stack effect and building pressurization from heating, ventilation and air-conditioning (HVAC) systems, the pressure measured at the true altitude of the receiver inside a building may be different from an outdoor pressure at the receiver's altitude, which may cause such approaches to generate an estimate of the receiver's altitude that deviates from an acceptable estimate of the true altitude at which the receiver is located. Furthermore, such deviations may change over the course of seasons as the HVAC system heats or cools the building.

As described in more detail below, different sets of pressure and temperature data may be determined for a range of altitudes within a building and at a range of temperature differences (e.g., the difference between the indoor temperature and the outdoor temperature). The different sets of data may then be used to determine weather profile parameters for the building. The generated weather profile parameters may later be used to generate corrections to an estimate of a receiver's altitude.

Described below are system and methods for estimating an altitude of a receiver using building weather profile parameters. Attention is initially drawn to examples of systems that may be used.

Figure 1:
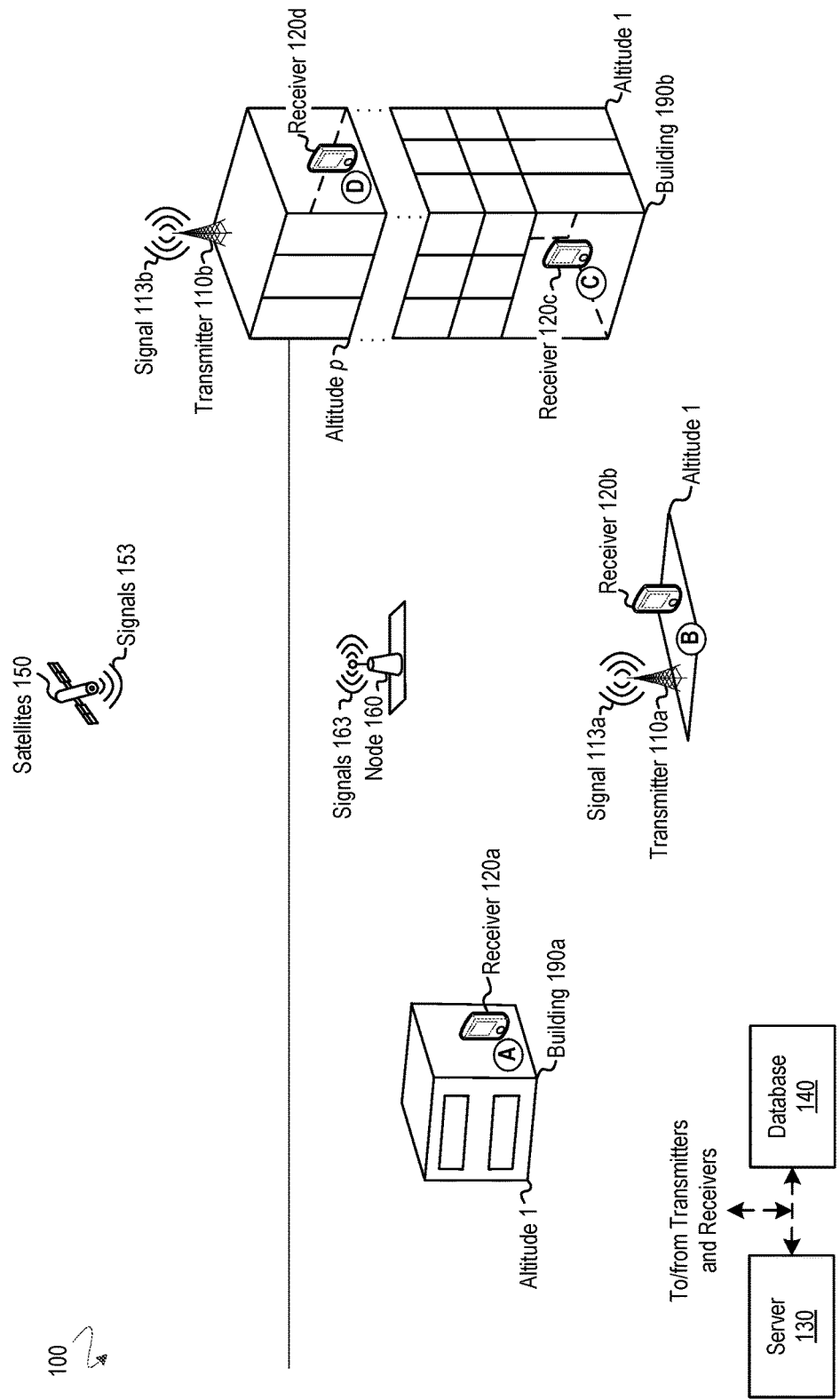
FIG. 1 illustrates an operational environment for correcting an estimated altitude of a receiver using building weather profile parameters.

FIG. 1 illustrates an operational environment for estimating an altitude of a receiver using building weather profile parameters. The operational environment contains a positioning system 100 that includes various components, including terrestrial transmitters 110 that are in a transmitter network, any number of receivers 120, a server 130 and a database 140. The transmitters 110 and the receivers 120 may be located at different altitudes or depths that are inside or outside various buildings 190. Signals 113, 153 and 163 are exchanged between the receivers 120 and the transmitters 110, satellites 150, and/or other nodes 160 using known wireless or wired transmission technologies. The transmitters 110 may transmit the signals 113 using one or more common multiplexing parameters—e.g. time slot, pseudo-random sequence, or frequency offset.

As illustrated in FIG. 1, the receivers 120 are at various positions within the environment 100: a first receiver 120a is inside a single-floor building 190a at altitude 1; a second receiver 120b is outdoors at altitude 1; and a third receiver 120c and a fourth receiver 120d are on two different floors of a multi-floor building 190b, at altitude 1 and altitude p, respectively. Each of the receivers 120 may receive signals transmitted by one or more of the transmitters 110, the node 160, and/or the satellites 150. Each of the receivers 120 may then use the received signals to estimate latitude and longitude of that receiver using known techniques. Each of the receivers 120 may generate an initial estimate of that receiver's altitude using known barometric-based approaches.

Given that the third receiver 120c and the fourth receiver 120d are located in the multi-floor building 190b, these receivers may experience deviations in indoor pressure from the outdoor ambient pressure. Receivers in single-floor buildings may also experience an artificial pressurization. Such pressure deviations can result in an inaccurate estimated altitude of these receivers. As described in more detail below, different sets of weather profile parameters may be determined for the multi-floor building 190b. The weather profile parameters can be stored at the database 140 (e.g., a location where data is stored), and later retrieved by the server 130 and/or the receivers 120c and 120d to correct for errors in the estimated altitudes generated for the locations of the third receiver 120c and the fourth receiver 120d.

Figure 2A:
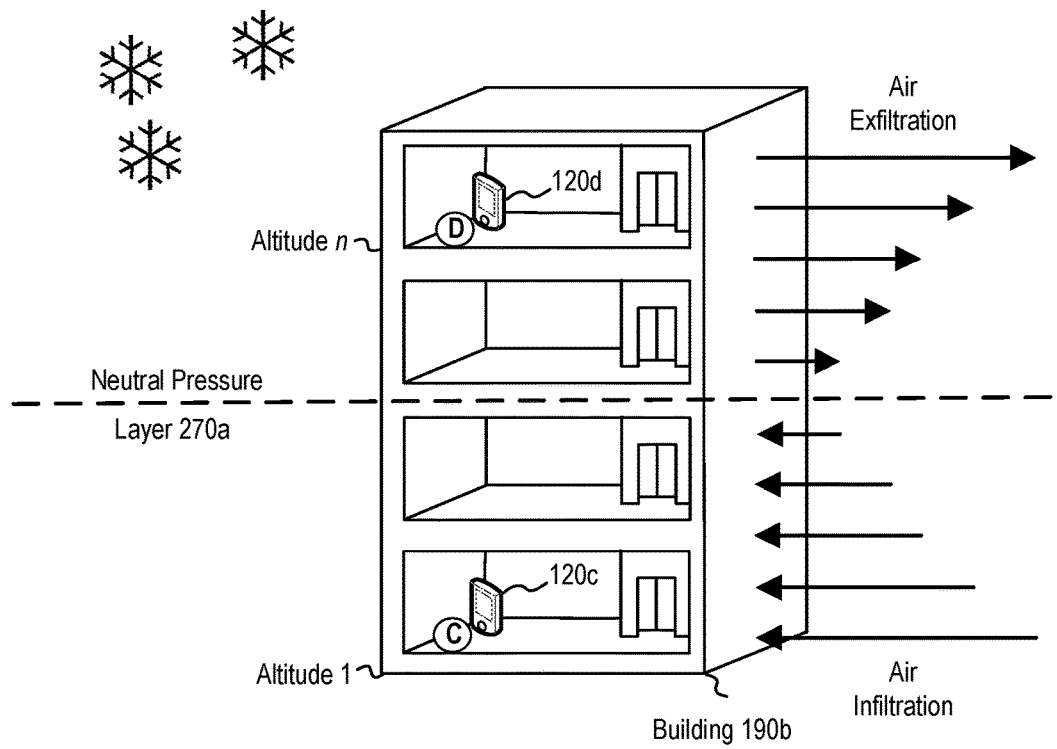
FIG. 2A depicts features of a building during a first time period (e.g., winter).
Figure 2B:
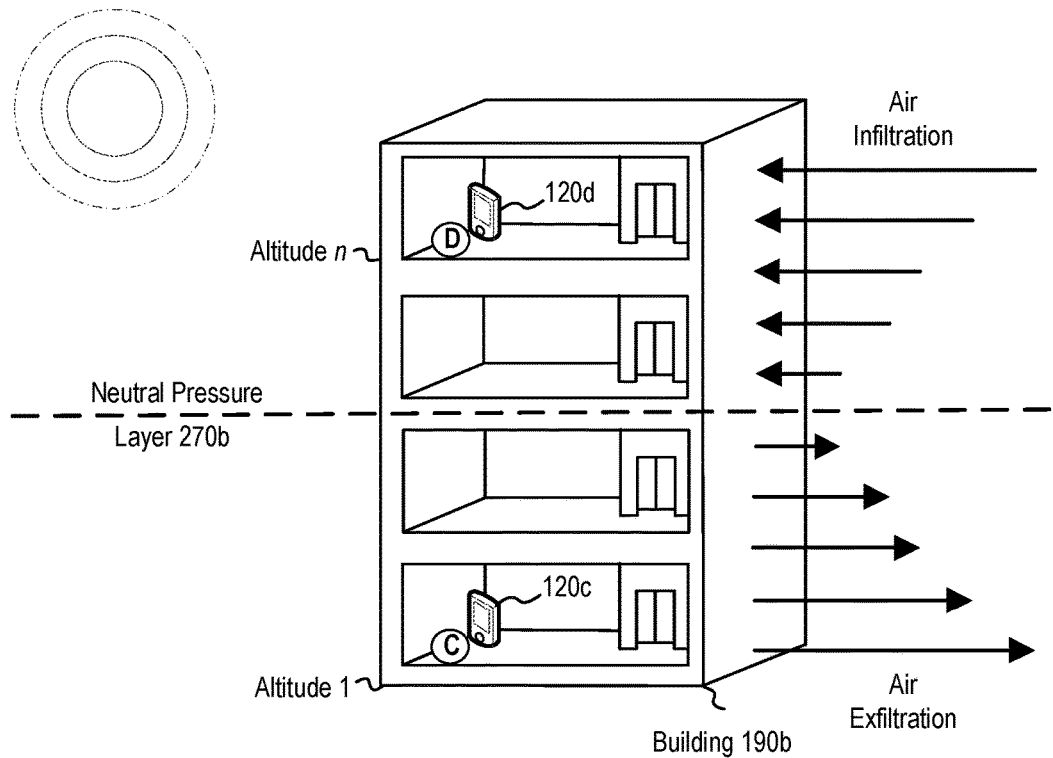
FIG. 2B depicts features of the building during a second time period (e.g., summer).

Details of the building 190b are illustrated in FIG. 2A, which shows features of the building 190b during a first time period (e.g., winter), and also FIG. 2B, which shows features of the building 190b during a second time period (e.g., summer).

Buildings such as the building 190b are often maintained at a comfortable temperature, typically ranging about 21 to 25° C. To achieve this temperature, a building's HVAC system heats the building during periods of colder outdoor temperature, and applies air-conditioning during periods of hotter outdoor temperature.

The stack effect (or "chimney effect"), combined with a building's HVAC system, can induce a pressure difference where the outdoor ambient pressure outside the building is different from the indoor pressure for that building at the same altitude. The error arising from the difference between indoor and outdoor pressure is mostly attributed to two important effects: stack effect and HVAC system performance (e.g., deliberate pressurization, indoor and outdoor temperature difference).

The stack effect is a well-understood air phenomenon. When the air outside of the building 190b is colder than the air inside the building 190b, the outside cold air "infiltrates" the bottom floors of the building through windows, doors, or cracks, and is warmed by the building's interior. As the air warms, it rises to the top of the building and "exfiltrates" out the top floors. Such air flow is illustrated in FIG. 2A. The motion of air through the building induces a pressure difference between the inside and outside of the building owing to the different air densities. The reverse idea also holds true when the air outside of the building 190b is warmer than the air inside the building, as is illustrated in FIG. 2B. Hot air "infiltrates" the top floors of the building 190b, and as it is cooled by the building, the air falls to the bottom of the building and "exfiltrates" out the bottom floors.

For buildings that are not perfectly sealed, air will leak through the windows, walls, cracks between different building materials, and other features of the buildings. As the air transitions from hot to cold, the dew point temperature can be reached and water vapor in the air can condense. Moisture inside walls can promote the growth of undesirable mold and mildew. In order to prevent this, HVAC systems deliberately pressurize a building such that air does not pass from hot to cold. During the cold winter months, buildings are under-pressurized so that hot air stays within the building and during the hot summer months buildings are over-pressurized so that hot air stays outside of the building.

A physical expression of a building's induced pressure difference ($\Delta P = P_{outdoor} - \Delta P_{indoor}$) can be expressed in terms of the stack effect and HVAC system performance:

$$\Delta P = \underbrace{A \times \left( \frac{1}{T_{outdoor}} - \frac{1}{T_{indoor}} \right) \times (H_{true} - H_{NPL})}_{\text{Stack Effect}} + \underbrace{B}_{\text{HVAC System Performance}}. \quad \text{(Equation 1)}$$

The temperature parameters $T_{outdoor}$ and $T_{outdoor}$ of Equation 1 can be determined using temperature sensors, and can be expressed in different units of measurement depending on the implementation (e.g., units of Kelvin). In one embodiment, the parameter $T_{indoor}$ may be generated at or near the receiver (e.g., by a temperature sensor installed in the building, or by a temperature sensor of the receiver). In another embodiment, $T_{indoor}$ can be assumed to be a standard indoor temperature (about 21 to 25° C., or another temperature value previously associated with a particular building, or measured by the building). The parameter $T_{outdoor}$ is estimated with an outdoor temperature reference sensor (e.g., generated at the transmitter 110 using a temperature sensor).

The parameter $H_{true}$ represents the true altitude of the receiver inside the building as measured through surveying. However, weather profile parameters A, B, and $H_{NPL}$ are unknown and may vary for each building according to the seasons.

The weather profile parameter A relates to the amount of air that passes through the surface boundary of the building (e.g., roof, walls, floors, doors, cracks, other features).

The weather profile parameter B relates to the performance of a particular building's HVAC system. That is, the parameter B serves as a bias to reflect the deliberate over or under pressurization of the building.

The weather profile parameter $H_{NPL}$ represents how the leakiness of air (e.g., air exfiltration and air infiltration) is distributed as a function of the building's height. The altitude corresponding to $H_{NPL}$ is the altitude at which an indoor pressure measurement would equal an outdoor pressure measurement at any given temperature differential, assuming no pressurization from HVAC in the building. If there were a pressurization, then the pressure differential would simply be B. This is shown in FIG. 2A as the "neutral pressure layer" 270a, and is shown in FIG. 2B as the "neutral pressure layer" 270b.

A physical expression of a building's induced pressure difference was illustrated in Equation 1. This expression can be simplified by substituting the following expression into Equation 1, where the inverted temperature difference is defined as:

$$\frac{1}{T_{outdoor}} - \frac{1}{T_{indoor}} = \Delta T. \quad \text{(Equation 2)}$$

After performing the above substitution, Equation 1 may be re-written as:

$$\Delta P = A \times \Delta T \times (H_{true} - H_{NPL}) + B \quad \text{(Equation 3)}.$$

Equation 3 illustrates how a pressure deviation experienced by a receiver within a building is a function of physical parameters A, B and $H_{NPL}$, $\Delta T$, and the true altitude of the receiver within the building $H_{true}$. This pressure deviation will result in an erroneous estimated altitude of a receiver, $H_{estimated}$, generated using an equation such as that shown in Equation 4, below:

$$H_{estimated} = \frac{RT}{gM} \ln\left(\frac{P_{sea-level}}{P_{user}}\right). \quad \text{(Equation 4)}$$

In the above equation, g corresponds to the acceleration due to gravity, $P_{sea-level}$ corresponds to the sea-level pressure (which can be replaced by a pressure at another reference altitude other than sea-level), $P_{user}$ corresponds to the pressure measured at or near the receiver, T corresponds to an ambient temperature that is usually measured outdoors (or to another reference temperature value), R is the universal gas constant and M is the molar mass of dry air. Clearly, when $P_{user}$ (i.e., the pressure measured at or near the receiver) deviates from the ambient outdoor pressure (e.g., by $\Delta P$) for a given actual altitude within a building, the estimated altitude $H_{estimated}$ will not reflect the true altitude of the receiver within the building.

It follows then that, if the physical weather profile parameters A, B, and $H_{NPL}$, can be determined for the building, the erroneous initial altitude can be corrected by finding the differential of Equation 4 assuming $\Delta P \ll P_{user}$ and then plugging the differential into Equation 3 to generate the following equation:

$$H_{corrected} = \frac{K \times H_{estimated} - A \times \Delta T \times H_{NPL} + B}{K - A \times \Delta T}, \quad \text{(Equation 5)}$$

$$\text{where } K = \frac{gMP_{user}}{RT}.$$

Estimating an Altitude of a Receiver Using Building Weather Profile Parameters

Figure 3:
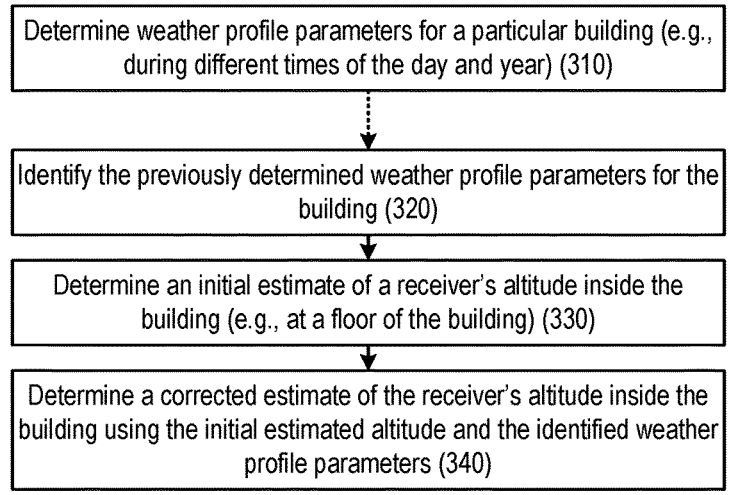
FIG. 3 illustrates functional details of correcting an estimated altitude of a receiver using building weather profile parameters.

In order to use Equation 5 to generate a corrected estimated altitude of a receiver, the building weather profile parameters, A, B, and $H_{NPL}$, must be determined. The steps within FIG. 3 illustrate functional details of estimating an altitude of a receiver using building weather profile parameters. Detailed descriptions of example embodiments for the individual steps of FIG. 3 are discussed in subsequent figures.

As shown at step 310, weather profile parameters are determined for a particular building. These weather profile parameters may be additionally associated with a particular time of a particular day and/or a particular season (e.g., summer or winter). The determination of weather profile parameters at step 310 may use data such as indoor and outdoor pressure and temperature measurements made at some time in the past (e.g., the previous summer or winter). One implementation of step 310 may include the sub-steps discussed later with reference to FIG. 4.

At step 320, the previously determined weather profile parameters are identified. For example, previously determined weather profile parameters may be stored in association with building (e.g., in association with a known identifier of the building), and later retrieved for use by a receiver when the receiver is located in the building. One implementation of step 320 may include the sub-steps discussed later with reference to FIG. 12.

At step 330, an initial estimate of the receiver's altitude inside the building (e.g., at a floor of the building) is determined. The initial estimate may be determined using a barometric-based approach as is known in the art (e.g., using Equation 4). One implementation of step 330 may include the sub-steps discussed later with reference to FIG. 13.

At step 340, the initial estimate and the identified weather profile parameters are used to generate a corrected estimate of the receiver's altitude. The corrected estimate is an estimate of the receiver's altitude that is more accurate (e.g., closer to the true altitude of the receiver) than the initial estimate of the receiver's altitude. One implementation of step 340 may include the sub-steps discussed later with reference to FIG. 14.

Each of or different groupings of the steps in FIG. 3 (i.e., steps 310 through 340) may be used in different embodiments (e.g., one embodiment uses only step 310, another embodiment uses steps 320 through 340, or other single-step or multi-step embodiments).

Example sub-steps of step 310 through step 340 are discussed below with reference to other figures.

Details of Determining Weather Profile Parameters for a Particular Building

Figure 4:
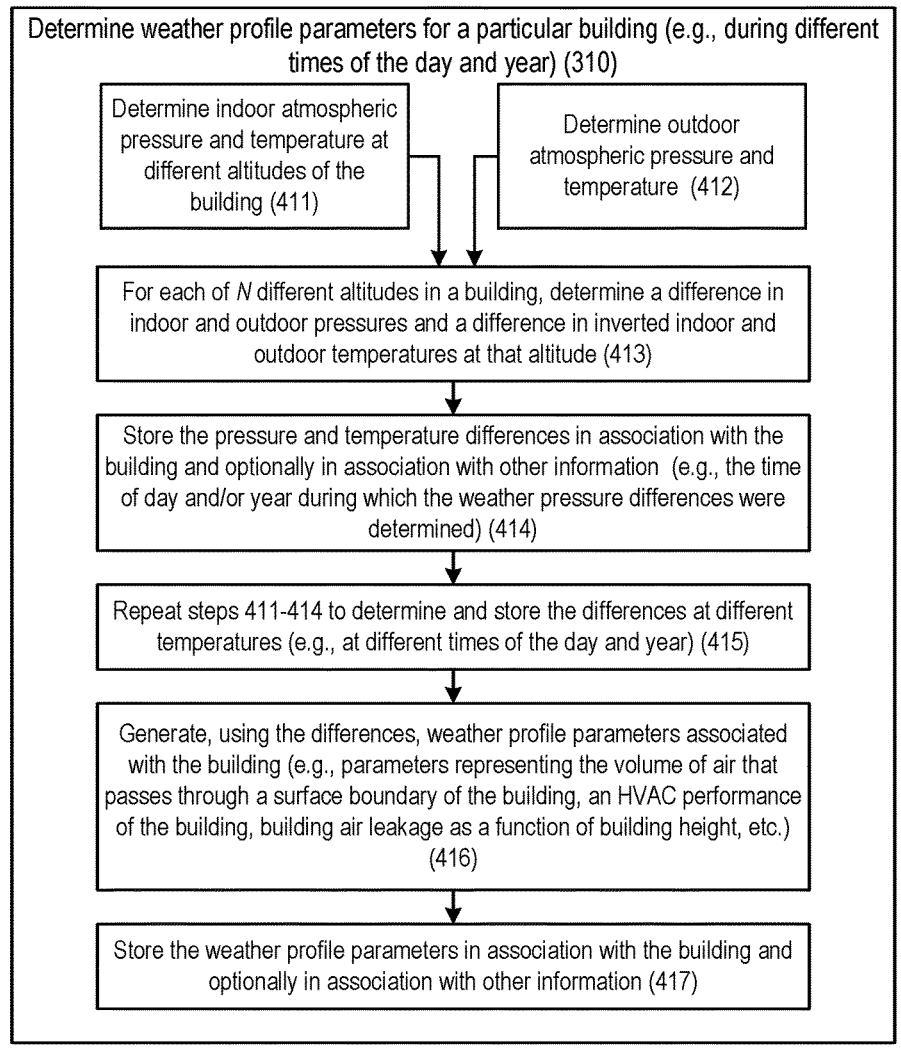
FIG. 4 illustrates steps of determining weather profile parameters for a particular building.

FIG. 4 provides detail of one implementation for step 310 of FIG. 3, and illustrates sub-steps of determining weather profile parameters for a particular building.

The sub-steps include: determining indoor pressure and temperature at different altitudes of the building (e.g., using pressure and temperature sensors of the receiver or of the building) (step 411); determining outdoor pressure and temperature at different altitudes of the building (e.g., using an outdoor reference beacon, a local outdoor weather instrumentation station, or other source) (step 412); for each of N altitudes in the building, determining a difference in indoor and outdoor pressure and an inverted temperature difference between an inverted indoor temperature and an inverted outdoor temperature corresponding to that altitude (step 413); storing the pressure and temperature differences in association with the building, and optionally in association with other information (e.g., the time of day and/or year during which the weather pressure differences were determined) (step 414); repeating steps 411-414 to determine and store the differences at different temperatures (e.g., for different outdoor temperatures at different times of the day and/or year) (step 415); using the differences to generate weather profile parameters associated with the building (step 416); and storing the weather profile parameters in association with the building (e.g., in association with a building identifier), and optionally in association with other information (e.g., the time of day and/or year) (step 417).

One implementation of step 413 may include sub-steps discussed later with reference to FIG. 6. Another implementation of step 413 may include sub-steps discussed later with reference to FIG. 7. One implementation of step 416 may include sub-steps discussed later with reference to FIG. 10.

Example Apparatus for Weather Profile Parameter Generation and Storage

Figure 5:
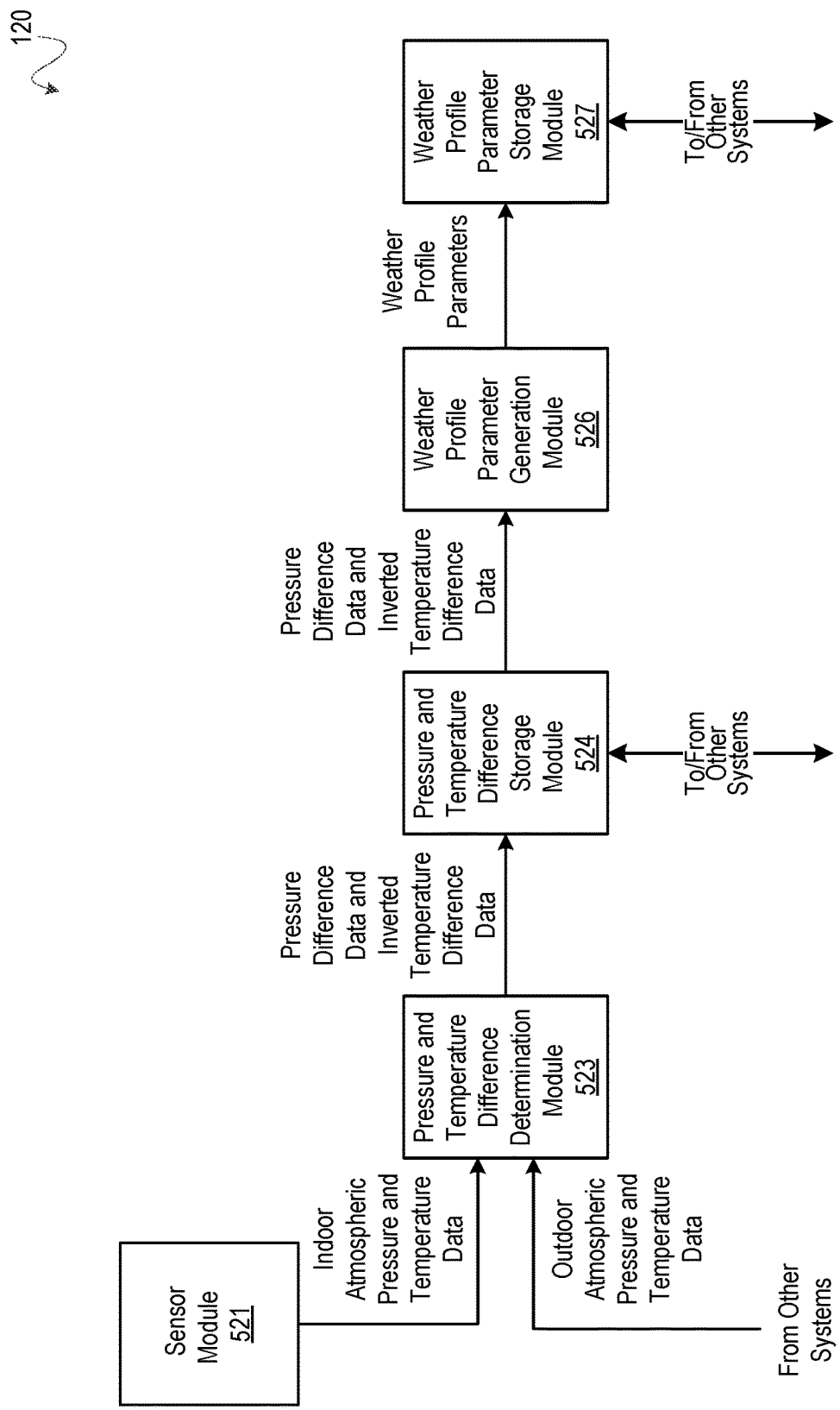
FIG. 5 illustrates one embodiment of an apparatus used for correcting an estimated altitude of a receiver using building weather profile parameters.

By way of example, FIG. 5 illustrates one embodiment of an apparatus used for estimating an altitude of a receiver using building weather profile parameters. The apparatus includes various modules that are each operable to carry out different steps of FIG. 4. In some embodiments, the apparatus is the receiver 120 as shown in FIG. 1. In other embodiments, the apparatus is a survey device used by a technician to determine weather profile parameters for a particular building.

As shown in FIG. 5, the various modules include: a sensor module 521 operable to perform step 411; a pressure and temperature difference determination module 523 operable to perform step 413; a pressure and temperature difference storage module 524 operable to perform step 414; a weather profile parameter generation module 526 operable to perform step 416; and a weather profile parameter storage module 527 operable to perform step 417. In one embodiment, the sensor module 521 is coupled to the pressure and temperature difference determination module 523, the pressure and temperature difference determination module 523 is coupled to the pressure and temperature difference storage module 524, the pressure and temperature difference storage module 524 is coupled to the weather profile parameter generation module 526, and the weather profile parameter generation module 526 is coupled to the weather profile parameter storage module 527.

As shown in FIG. 5, the sensor module 521 provides indoor pressure and temperature data to the pressure and temperature difference determination module 523. The pressure and temperature difference module 523 also receives outdoor pressure and temperature data from other systems (e.g., from an outdoor reference beacon, from a local outdoor weather instrumentation station, or other source). The pressure and temperature difference module 523 determines a pressure difference, ΔP, between the indoor and outdoor pressure, and also determines an inverted temperature difference, $$\Delta T = \frac{1}{T_{outdoor}} - \frac{1}{T_{indoor}},$$

between inverted indoor temperature and inverted outdoor temperature.

The pressure difference and inverted temperature difference, ΔP and ΔT, are passed to the pressure and temperature difference storage module 524, which stores ΔP and ΔT for later use. The data ΔP and ΔT may be stored with, or linked to, other associated data such as a date stamp, a time stamp, a corresponding altitude at which the data was measured, a building identifier, a 2D or 3D coordinate at which the data was measured, or other data. As shown, the storage module 524 may store data locally, or send the data to other systems (e.g., the server 130 and the database 140 of FIG. 1).

The weather profile parameter generation module 526 retrieves previously stored ΔP's and ΔT's along with any associated data from the pressure and temperature difference storage module 524, and uses the retrieved data to generate weather profile parameters, A, B and $H_{NPL}$. The weather profile parameter generation module 526 then provides the generated weather profile parameters, A, B and $H_{NPL}$, to the weather profile parameter storage module 527, which may store the generated weather profile parameters locally or send the data to other systems. The generated weather profile parameters may be stored with associated data such as a date stamp, a time stamp, a corresponding altitude, a building identifier, a two-dimensional or three-dimensional coordinate, or other data.

By way of example, the sensor module 521 includes the pressure sensor and temperature sensor; the pressure and temperature difference determination module 523 includes one or more machines listed herein that are capable of carrying out step 413 of FIG. 4 (e.g., a processor); the pressure and temperature difference storage module 524 includes a local storage medium (e.g., memory) and additionally or alternatively provides a communication pathway to a remote storage location (e.g., a server/database); the weather profile parameter generation module 526 includes one or more machines listed herein that are capable of carrying out step 416 of FIG. 4 (e.g., a processor); and the weather profile parameter storage module 527 includes a local storage medium (e.g., memory) and/or other storage devices listed herein and, additionally or alternatively, provides a communication pathway to a remote storage location (e.g., a server/database).

Determining Differences in Indoor and Outdoor Pressure and Temperature at Different Altitudes of a Building Using a Building Survey Approach In order to determine the weather profile parameters for a building, a difference in indoor and outdoor pressure, and a difference in inverted indoor and outdoor temperature must be determined at different altitudes within the building. Attention is now drawn to FIG. 6, which illustrates one embodiment for determining differences in indoor and outdoor pressure, and difference in inverted indoor and outdoor temperature at different altitudes of the building. These steps may occur as part of step 413 of FIG. 4.

As shown, at step 613a, an expected outdoor pressure and temperature corresponding to the altitude of an identified floor are determined. In one embodiment, an outdoor pressure reference source at a known altitude (e.g., a transmitter 110) provides the outdoor pressure at a known altitude. This outdoor pressure is then, or was previously, translated to an expected pressure at the altitude of the identified floor. The steps of translating the pressure value associated with a known altitude to an expected pressure at another altitude are known in the art. For example, if the outdoor pressure were located at altitude A, then the pressure translated to altitude B is calculated by inverting Equation 4 to:

$$P_B = P_A \exp\left(\frac{gM(A-B)}{RT}\right).$$

If ambient temperature is measured at altitude A, the measured ambient temperature may be translated as follows: $T_B = T_A \times \gamma \times (B-A)$, where γ is the temperature lapse rate.

At step 613b, the pressure difference associated with the expected outdoor pressure and the indoor pressure for the identified floor is determined (e.g., by subtracting the indoor pressure from the outdoor pressure).

Next, at step 613c, the inverted temperature difference, $$\Delta T = \frac{1}{T_{outdoor}} - \frac{1}{T_{indoor}},$$

associated with the outdoor temperature $T_{outdoor}$ and indoor temperature $T_{indoor}$ for the identified floor is determined (e.g., by subtracting an inverted indoor temperature from an inverted outdoor temperature).

At step 613*d*, the steps of 613*a* through 613*c* are repeated for different floors. In one embodiment, a technician carries out the steps at two or more floors of a particular building. Additionally, the technician may carry out the steps at different times of the day, and at different seasons of the year.

Determining Differences in Indoor and Outdoor Pressure and Temperature at Different Altitudes of a Building Using a Crowd-Sourced Approach Though a technician could carry out the steps of FIG. 6, such a process may be time consuming as it requires multiple measurements in a building made at multiple different times and dates (e.g., time of day, different temperatures, different seasons, or other). Additionally, there may be many different buildings to profile in an urban setting. Hence, a crowdsourcing approach to collecting the pressure and temperature data is preferred.

However, given that a receiver may not be able to estimate an accurate altitude within a building, the approach detailed in FIG. 6 may not be reliable when used by the receiver. Thus, the difference between an expected altitude of the receiver and an estimated altitude at the receiver is used to determine differences in pressure, as is detailed below.

Figure 7:
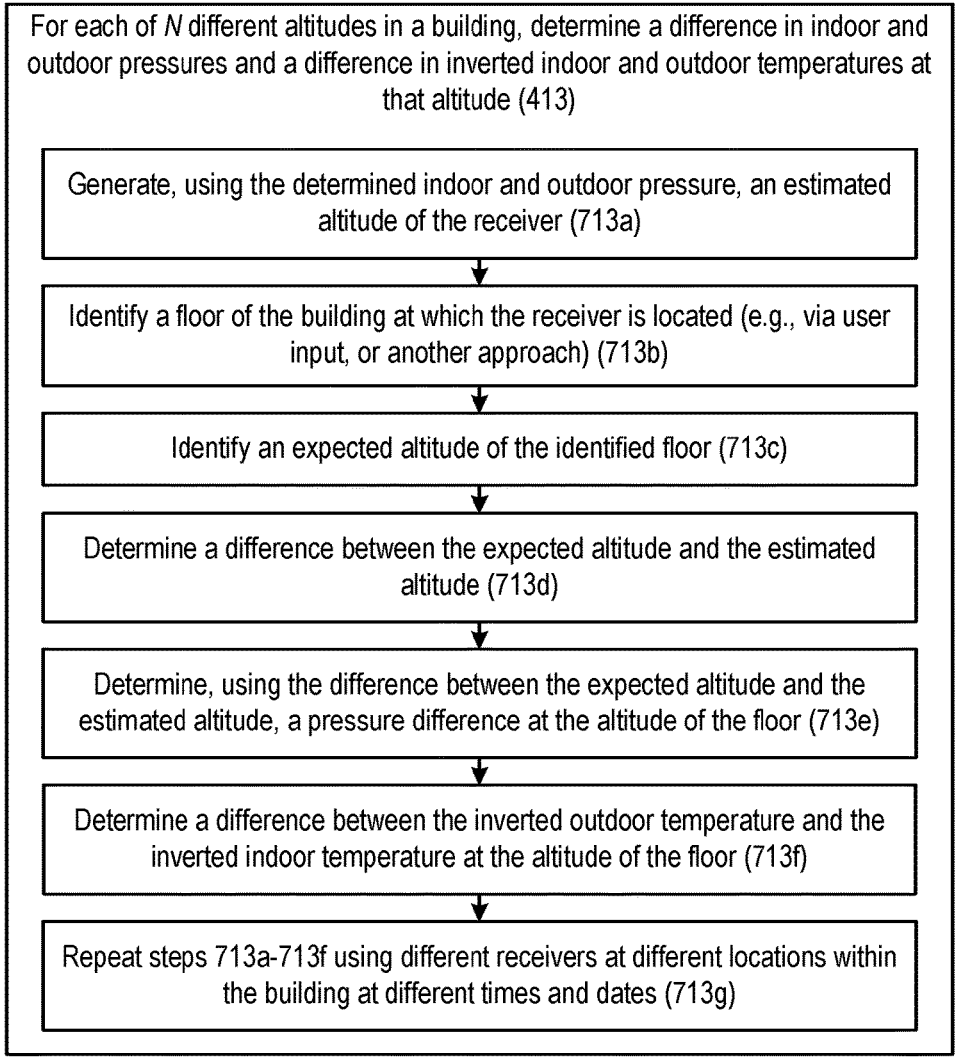
FIG. 7 illustrates another embodiment for determining differences in indoor and outdoor pressure and temperature at different altitudes of the building.

Attention is now drawn to FIG. 7, which illustrates steps of one embodiment for determining differences in indoor and outdoor pressures and differences in inverted indoor and outdoor temperatures at different altitudes of the building. These steps may occur as part of step 413 of FIG. 4.

At step 713*a*, an estimated altitude of the receiver is generated using the determined indoor and outdoor pressures.

At step 713*b*, the floor of the building at which the receiver is located is identified. In one implementation, a user may be prompted by the receiver to manually enter the floor at which the user currently resides. Other implementations for identifying a floor are also contemplated—e.g., the receiver detecting LAN signals that can only be received at a particular floor, or other known approaches.

At step 713*c*, an expected altitude of the receiver is identified. For example, the floor identified in the previous step may be used to retrieve the expected altitude from a database (e.g., looking up the altitude from a database using the floor number and a building identifier).

At step 713*d*, a difference between the expected altitude and the estimated altitude is determined.

Using the difference in altitude, at step 713*e*, the pressure difference at the altitude of the floor is determined. For example, Equation 6 shown below can be generated by finding the differential of Equation 4 and assuming $\Delta P \ll P_{user}$. Equation 6 determines a pressure difference given the difference between expected and estimated altitude:

$$\Delta P = \frac{gMP_{user}}{RT}(H_{expected} - H_{estimated}),\quad \text{(Equation 6)}$$

where $H_{expected}$ is the expected altitude, $H_{estimated}$ is the estimated altitude, g is the acceleration due to gravity, $P_{user}$ corresponds to the pressure measured at or near the receiver, T corresponds to the ambient temperature (or other reference temperature) that is usually measured outdoors, R is the universal gas constant, and M is the molar mass of dry air.

At step 713*f*, a difference between the inverted outdoor temperature and inverted indoor temperature at the altitude of the floor is determined. For example, a temperature measured at the receiver or an assumed indoor temperature range of 21–25° C. may be compared to a temperature measured by an outdoor reference sensor or a temperature translated from the temperature measured by the outdoor reference sensor.

At step 713*g*, steps 713*a* through 713*f* are repeated using the same or different receivers at different locations within the building and at different times and dates. These results may be stored at a remote storage location (e.g., the database 140), and later retrieved for processing when a sufficient amount of data has been collected (e.g., when enough data to perform a linear fit has been collected, as will be discussed below).

Having gathered the crowd-sourced atmospheric data (e.g., pressure and temperature differences) as described above using various participating user's receivers, the gathered data can be used to determine weather profile parameters by performing a linear fit.

Determining Weather Profile Parameters A, B and $H_{NPL}$ Using Fit Parameters C and D Having gathered a sufficient number of different pressure and temperature differences within a building, this atmospheric data is then used to determine linear fit parameters, C and D, which can be used to determine the physical weather profile parameters of the building, A, B and $H_{NPL}$.

Figure 8:
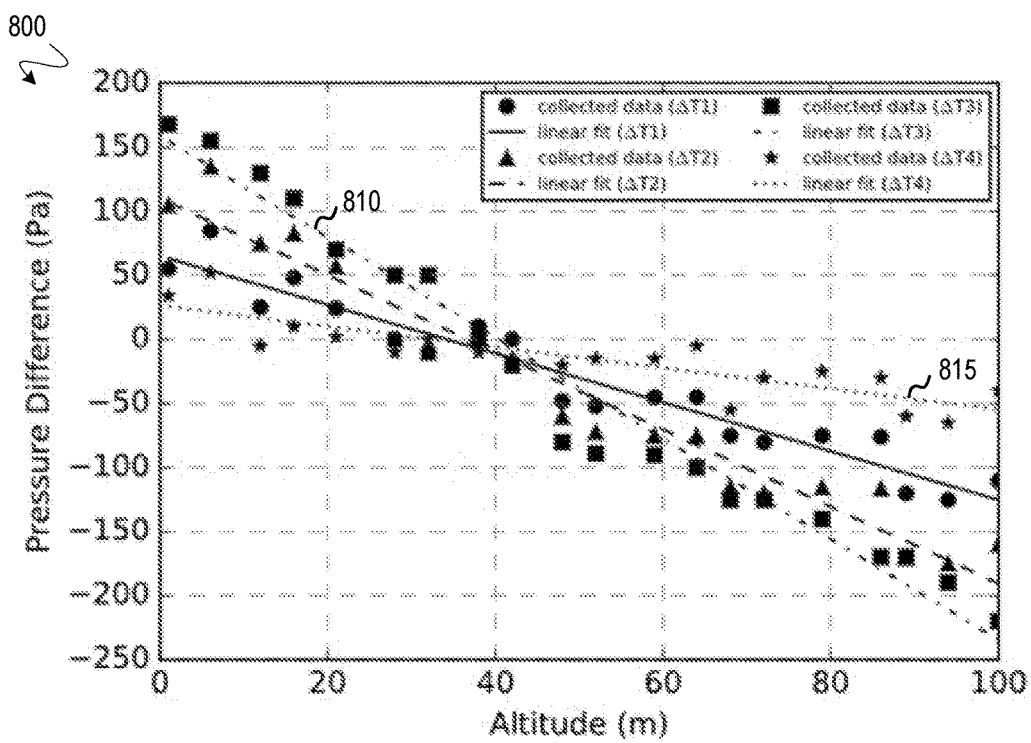
FIG. 8 depicts different sets of data that were captured at different temperature differences, and the linear fit for each set of data.

FIG. 8 depicts N=4 different sets of data that were captured at N=4 different temperature differences $\Delta T_E$, and the linear fit of each set of data.

Figure 9:
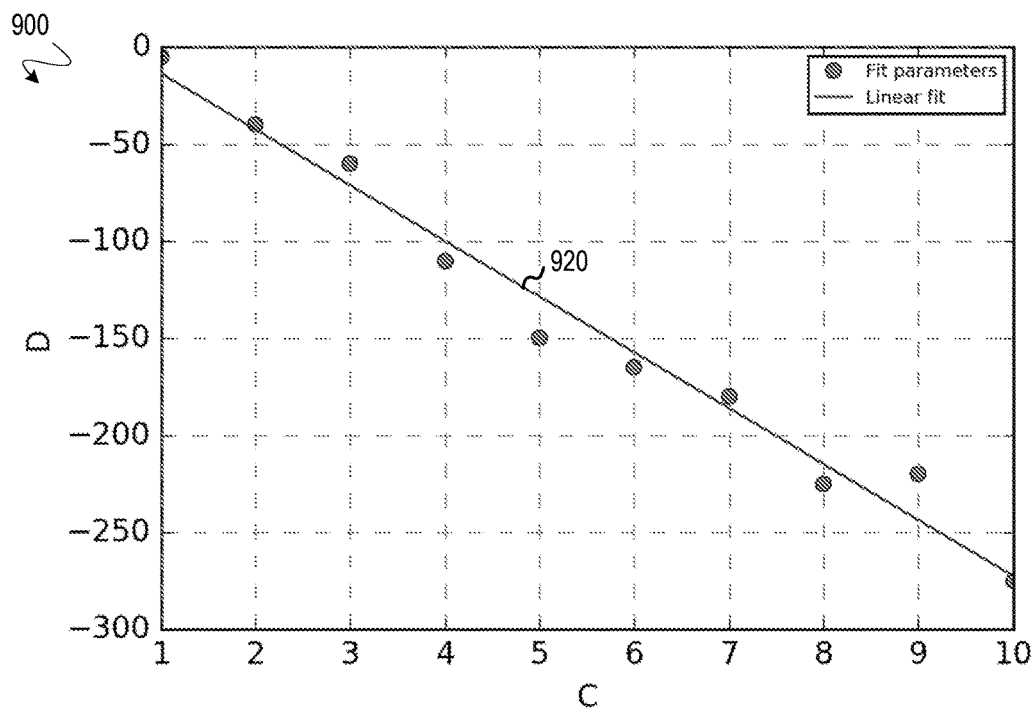
FIG. 9 depicts an example linear fit generated using multiple fit parameters generated from different sets of data.

FIG. 9 depicts an example linear fit generated using multiple fit parameters $C_n$ and $D_n$ generated from N=10 different sets of data.

As will be discussed below, such captured data can be used to determine the physical weather profile parameters A, B and $H_{NPL}$.

Determining Fit Parameters C and D

A physical expression of building-induced pressure difference was shown in Equation 1, and expressed again in a simplified form in Equation 3. Besides these physical expressions, another expression of building-induced pressure difference can be written in the form of a fitting equation with fit parameters C and D:

$$\Delta P = C \times H_{true} + D \quad \text{(Equation 7)},$$

where $H_{true}$ is the true altitude of a receiver in a building. Equation 3 and Equation 7 can be combined to generate the following expressions:

$$A \times \Delta T \times (H_{true} - H_{NPL}) + B = C \times H_{true} + D \quad \text{(Equation 8)}.$$

Distributing the left side provides:

$$A \times \Delta T \times H_{true} - A \times \Delta T \times H_{NPL} + B = C \times H_{true} + D \quad \text{(Equation 9)}.$$

Then, matching the two sides of Equation 9, expressions of C and D can be written as:

$$C = A \times \Delta T \quad \text{(Equation 10)},$$

and $$D = -A \times \Delta T \times H_{NPL} + B \quad \text{(Equation 11)}.$$

After combining Equation 10 and Equation 11, the following expression for the fit parameter, D, is generated:

$$D = -C \times B \quad \text{(Equation 12)}.$$

Thus, with reference to Equation 10 through Equation 12, it is shown that the fit parameters C and D can be expressed in terms of physical parameters, A, B and $H_{NPL}$. Therefore, the physical weather profile parameters for a particular building can be determined using the fit parameters C and D.

Figure 10:
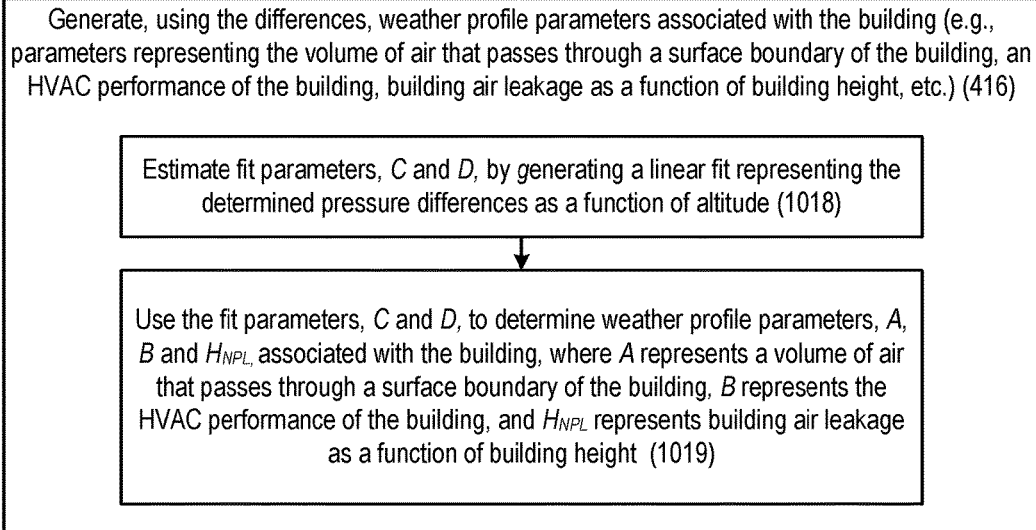
FIG. 10 illustrates steps of using pressure and temperature data to generate weather profile parameters associated with the building.

Determining Physical Parameters A, B and $H_{NPL}$ Using Fit Parameters C and D Attention is now turned to FIG. 10, which provides functional details of step 416 of FIG. 4. As shown, FIG. 10 illustrates steps of using pressure and temperature data to generate weather profile parameters associated with the building.

At step 1018, the fit parameters C and D are estimated by generating a linear fit representing the determined pressure differences as a function of altitude, where C represents the slope of the linear fit, and D represents the y-intercept of the linear fit. Examples of such a linear fit corresponding to two different temperature differences $\Delta T_3$ and $\Delta T_4$ are shown in FIG. 8 as line 810 and line 815, respectively.

At step 1019, the fit parameters C and D are used to determine the weather profile parameters, A, B and $H_{NPL}$, associated with the building. Having estimated fit parameters C and D, and having previously determined the temperature difference $\Delta T$, the weather profile parameters can be determined using Equation 10 through Equation 12.

Determining Physical Parameters A, B and $H_{NPL}$ Using Multiple Sets of Fit Parameters, C and D While it is possible to use only two sets of measured data to estimate the correlation between fit parameters C and D, and the physical weather profile parameters A, B and $H_{NPL}$, a more robust solution is generated by using multiple sets of data.

Consider a first set of pressure differences collected at a first inverted temperature difference $\Delta T_1$, and an additional set of pressure differences collected at a second inverted temperature difference $\Delta T_2$, where $\Delta T_1$ does not equal $\Delta T_2$. Based on Equation 10, the physical parameter $A_1$ can be solved as shown:

$$A_1 = \frac{C_1}{\Delta T_1}. \quad \text{(Equation 13)}$$

The physical parameter $A_2$ can be solved as shown:

$$A_2 = \frac{C_2}{\Delta T_2}. \quad \text{(Equation 14)}$$

A final value of physical weather profile parameter A is then determined by taking the average of $A_1$ and $A_2$.

The physical weather profile parameters $H_{NPL}$ and B may be determined by rewriting Equation 12 as:

$$D_1 = -C_1 \times H_{NPL} B \quad \text{(Equation 15),}$$

and $$D_2 = -C_2 \times B \quad \text{(Equation 16).}$$

Thus, using Equation 15 and Equation 16, physical parameters $H_{NPL}$ and B can be determined as follows:

$$H_{NPL} = -\frac{D_2 - D_1}{C_2 - C_1}, \quad \text{(Equation 17)}$$

and $$B = D_2 - C_2 \times \frac{D_2 - D_1}{C_2 - C_1}. \quad \text{(Equation 18)}$$

Figure 11:
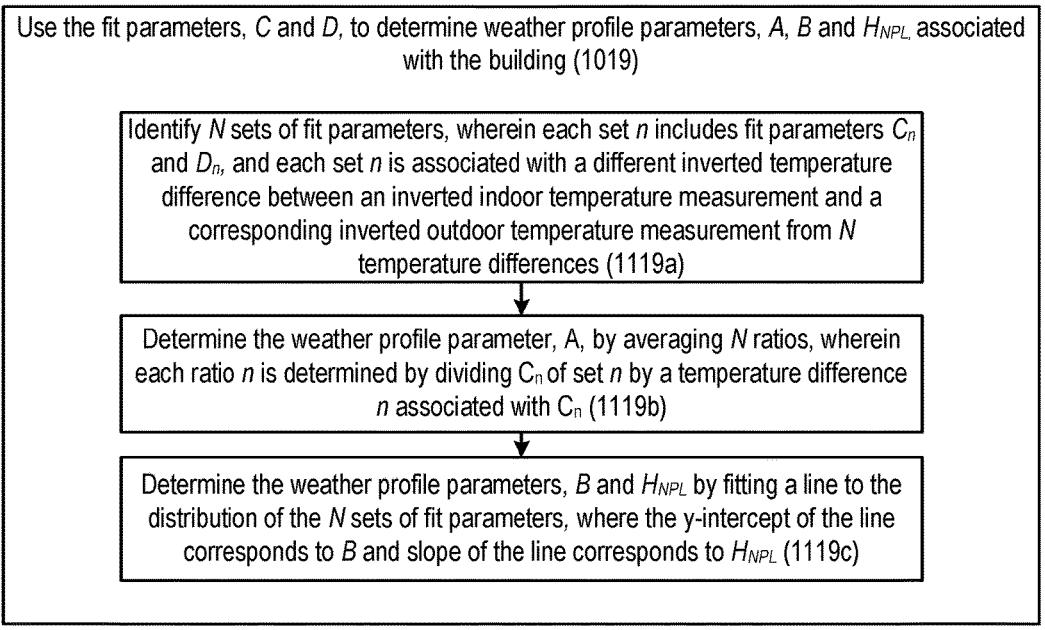
FIG. 11 illustrates one embodiment for determining weather profile parameters using multiple fit parameters.

FIG. 11 illustrates one embodiment for determining weather profile parameters, A, B and $H_{NPL}$, using multiple fit parameters, $C_n$ and $D_n$. The fit parameters $C_n$ and $D_n$ are determined using multiple sets of data collected at different altitudes and different temperatures. These steps could occur at step 1019 of FIG. 10.

At step 1119a, N sets of fit parameters $C_n$ and $D_n$ associated with N different differences between an inverted indoor temperature measurement and a corresponding inverted outdoor temperature measurement are identified. For example, FIG. 8 shows N=4 sets of data collected at N temperature differences. The N data sets are used to generate the N sets of fit parameters, $C_n$ and $D_n$, for n equals 1 to N.

At step 1119b, the weather profile parameter A is determined by finding the average of N ratios, where each of the N ratios is determined by dividing a corresponding fit parameter $C_n$ by a temperature difference $\Delta T_n$ associated with that $C_n$. An expression of the average may be written as:

$$A = \frac{\frac{C_1}{\Delta T_1} + \frac{C_2}{\Delta T_2} + \ldots + \frac{C_N}{\Delta T_N}}{N}. \quad \text{(Equation 19)}$$

At step 1119c, the weather profile parameters, B and $H_{NPL}$, are determined by fitting a line to the distribution of each of the N fit parameters $C_n$ and $D_n$. This is illustrated in FIG. 9, where the y-intercept of line 920 corresponds to the physical parameter B, and the slope of the line 920 corresponds to the physical parameter $H_{NPL}$.

Having determined the weather profile parameters associated with the building, these weather profile parameters can be used to determine a corrected estimate of the receiver's altitude within the building, as is further discussed below.

Identifying Previously Determined Weather Profile Parameters for a Building

Figure 12:
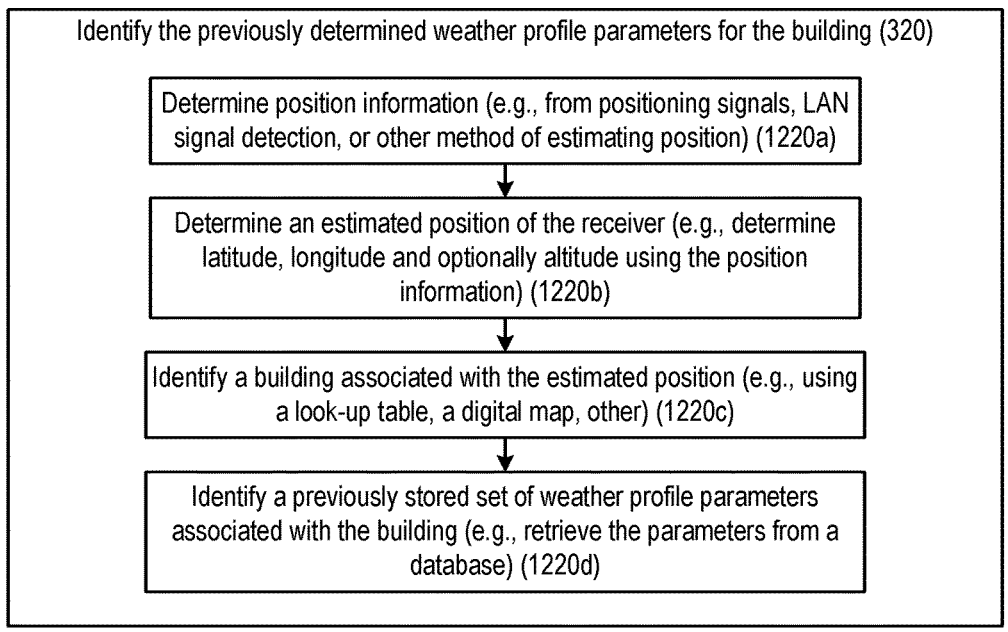
FIG. 12 illustrates one embodiment for identifying previously determined weather profile parameters for a building.

Attention is now turned to FIG. 12, which illustrates one embodiment for identifying the previously determined weather profile parameters for a building. These steps may occur as part of step 320 of FIG. 3.

At step 1220a, position information is determined from positioning signals. Such positioning signals may have originated from beacons in one or more of a GNSS positioning system, a terrestrial positioning system, a cellular network positioning system, other system, or combinations thereof. Position information may include time-of-arrival (TOA) measurements, location information about the origin of the positioning signals (e.g., location coordinates of the beacons), or other position information known in the art.

At step 1220b, the position information is used to determine an estimated position of the receiver (e.g., latitude, longitude and/or altitude).

At step 1220c, the estimated position of the receiver is used to identify a building associated with the estimated position. For example, the estimated position may be used with a lookup table that maps the estimated position to buildings within a region; or, the estimated position may be used with a digital map (e.g., an internet mapping solution) to determine a building associated with the estimated position. In another embodiment, the building may be identified by a user of the receiver via user input, or by a LAN beacon, or by other means known in the art.

At step 1220d, a previously stored set of weather profile parameters associated with the building are identified. For example, the weather profile parameters may be retrieved from a database (e.g., the server 130 and/or the database 140). The weather profile parameters may reside in a lookup table that maps a building identifier to a set of weather profile parameters associated with that building. Additionally, the identified weather profile parameters may be associated with a particular time of day, date of the year, and/or season. For example, a particular building may have a different set of weather profile parameters for each of the four seasons, for particular dates of the year, and/or for particular times of day.

Having identified a previously determined set of weather profile parameters associated with the building, the receiver then determines an initial estimate of the receiver's altitude within the building. These steps do not need to occur in a particular order.

Figure 13:
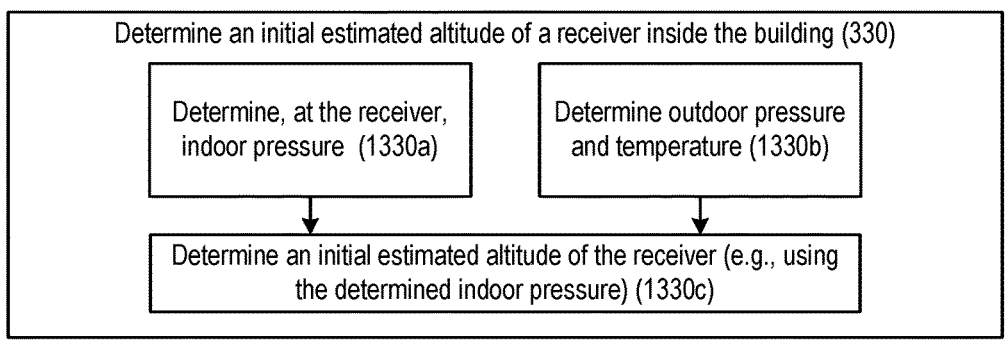
FIG. 13 illustrates one embodiment for determining an initial estimate of a receiver's altitude inside a building.

Determining an Initial Estimate of the Receiver's Altitude Inside the Building Attention is now turned to FIG. 13, which illustrates one embodiment for determining an initial estimate of a receiver's altitude inside the building. These steps may occur as part of step 330 of FIG. 3. At step 1330a, an indoor pressure measurement is determined at the location of the receiver (e.g., using a pressure sensor of the receiver). At step 1330b, outdoor pressure and temperature measurements are determined. In one embodiment, the outdoor pressure and temperature measurements are determined using an outdoor reference beacon. In another embodiment, the outdoor pressure and temperature are determined using a local outdoor weather instrumentation station, an estimation approach, or other approach. At step 1330c, the initial estimate of a receiver's altitude $H_{initial}$ is determined using an expression such as that shown below in Equation 20:

$$H_{initial} = \frac{RT}{gM} \ln\left(\frac{P_{sea-level}}{P_{indoor}}\right), \quad \text{(Equation 20)}$$

where $P_{indoor}$ is the indoor pressure, and $P_{sea-level}$ is P an estimated sea-level pressure that is computed using the outdoor pressure $P_{outdoor\_N}$ and the outdoor temperature $T_{outdoor\_N}$ for an altitude $H_N$, as shown below in Equation 21:

$$P_{sea-level} = P_{outdoor\_N} \exp\left(\frac{gMH_N}{RT_{outdoor\_N}}\right). \quad \text{(Equation 21)}$$

Having identified previously determined weather profile parameters associated with the building, and having determined an initial estimate of a receiver's altitude within the building, the weather profile parameters are then used to determine a corrected estimated altitude of the receiver within the building.

Figure 14:
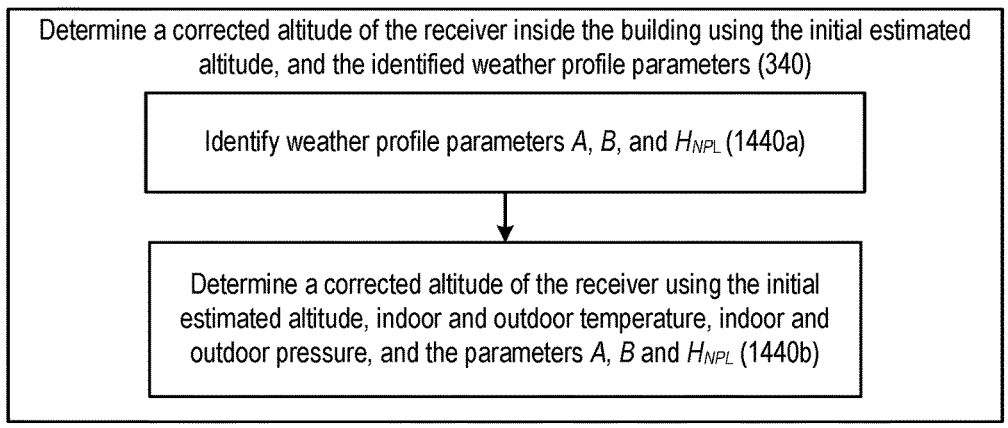
FIG. 14 illustrates one embodiment for determining a corrected altitude of the receiver inside the building using the initial estimate of a receiver's altitude and the identified weather profile parameters.

Determining a Corrected Altitude of a Receiver Using the Identified Weather Profile Parameters Attention is now turned to FIG. 14, which illustrates one embodiment for determining a corrected altitude of the receiver inside the building using the initial estimate of a receiver's altitude and the identified weather profile parameters. These steps may occur as part of step 340 of FIG. 3.

At step 1440a, weather profile parameters A, B, and $H_{NPL}$ are identified. Then, at step 1440b, these weather profile parameters are used to determine a corrected altitude of the receiver using the initial estimate of a receiver's altitude, indoor and outdoor temperature, and indoor and outdoor pressure.

As shown below in Equation 22, given the initial estimate of a receiver's altitude $H_{initial}$, the indoor temperature $T_{indoor}$, the outdoor temperature $T_{outdoor}$, and weather profile parameters A, B and $H_{NPL}$, the corrected altitude $H_{corrected}$ of the receiver can be determined. This corrected altitude is more accurate than the initial estimate of a receiver's altitude $H_{initial}$.

$$H_{corrected} = \frac{K \times H_{initial} - A \times \Delta T \times H_{NPL} + B}{K - A \times \Delta T}, \quad \text{(Equation 22)}$$

where $K = \frac{gMP_{indoor}}{RT_{outdoor}}$, $H_{initial} = \frac{RT_{outdoor}}{gM} \ln\left(\frac{P_{sea-level}}{P_{indoor}}\right)$, and $\Delta T = \frac{1}{T_{outdoor}} - \frac{1}{T_{indoor}}$.

Figure 15:
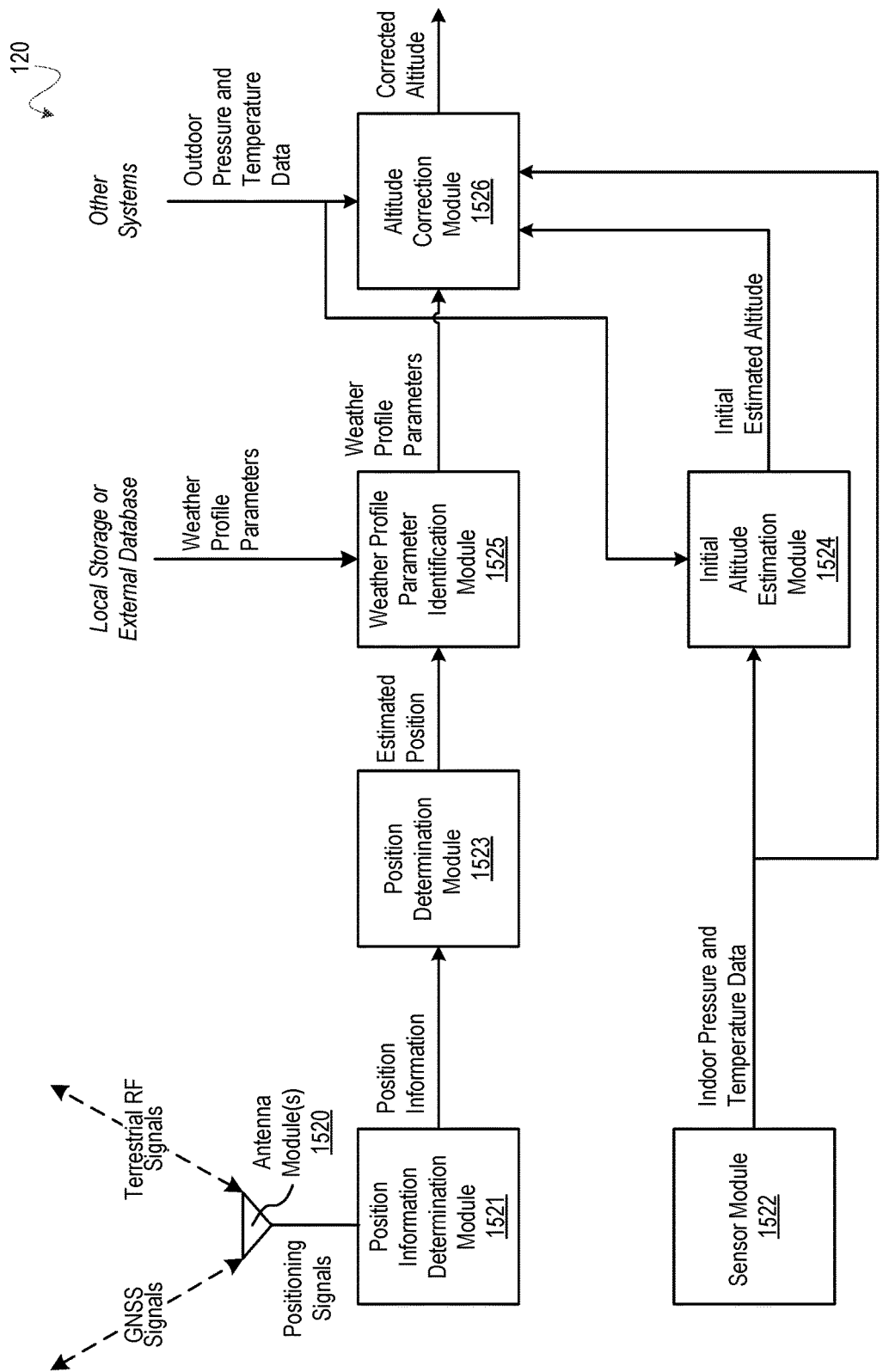
FIG. 15 depicts an embodiment of an apparatus used for correcting an estimated altitude of a receiver using building weather profile parameters.

By way of example, FIG. 15 illustrates another embodiment of an apparatus used for estimating an altitude of a receiver using building weather profile parameters. The apparatus includes various modules that are each operable to carry out different steps of FIG. 12, FIG. 13 and FIG. 14. In one embodiment, this apparatus of FIG. 15 is the receiver 120.

As shown in FIG. 15, the modules may include: antenna module(s) 1520 operable to receive positioning signals (e.g., GNSS signals, terrestrial RF Signals, etc.); a position information determination module 1521 operable to use the positioning signals to perform step 1220a; a position determination module 1523 operable to perform step 1220b; a sensor module 1522 operable to perform step 1330a; an initial altitude estimation module 1524 operable to perform step 1330c; a weather profile parameter identification module 1525 operable to perform step 1440a; and an altitude correction module 1526 operable to perform step 1440b.

In one embodiment, the antenna module(s) 1520 are coupled to the position information determination module 1521, the position information determination module 1521 is coupled to the position determination module 1523, the position determination module 1523 is coupled to the weather profile parameter identification module 1525, the weather profile parameter identification module 1525 is coupled to the altitude correction module 1526, the sensor module 1522 is coupled to the initial altitude estimation module 1524 and the altitude correction module 1526, and the initial altitude estimation module 1524 is coupled to the altitude correction module 1526.

As shown in FIG. 15, the antenna module(s) 1520 provide positioning signals to the position information determination module 1521. The position information determination module 1521 uses the positioning signals to generate position information (e.g., TOAs, pseudoranges, and/or location information about beacons if delivered in positioning signals) and then passes the position information to the position determination module 1523. The position determination module 1523 uses the position information to generate an estimated position of the receiver (e.g., using trilateration or another known technique), which is then passed to the weather profile parameter identification module 1525.

The weather profile parameter identification module 1525 uses the estimated position to identify a set of weather profile parameters associated with the estimated position (e.g., weather profile parameters for a building at or near the estimated position). These weather profile parameters are then transmitted to the altitude correction module 1526. In different embodiments, the weather profile parameters may be retrieved from a local storage module (not shown) within the apparatus, or from an external database. In one embodiment, the weather profile parameters are associated with the estimated position instead of a building.

The sensor module 1522 determines measurements of indoor pressure and temperature at the location of the receiver. The indoor pressure measurement is transmitted to the initial altitude estimation module 1524 and is also transmitted to the altitude correction module 1526. The initial altitude estimation module uses the indoor pressure data to estimate an initial altitude of the receiver (e.g., using Equation 20). The initial estimate of a receiver's altitude is then passed to the altitude correction module 1526, which uses the weather profile parameters, the initial estimate of a receiver's altitude, and indoor and outdoor pressure and temperature data to generate a corrected altitude of the receiver (e.g., using Equation 22).

By way of example, the sensor module 1522 includes a pressure sensor and temperature sensor; the weather profile parameter identification module 1525 includes a local storage medium (e.g., a memory) and, additionally or alternatively, provides a communication pathway to a remote storage location (e.g., a server/database); and the position determination module 1523, the weather profile parameter identification module 1525, the initial altitude estimation module 1524, and the altitude correction module 1526 includes one or more machines listed herein that are capable of carrying out the steps associated with each of the aforementioned modules (e.g., one or more processors).

Other Aspects

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a receiver can be performed by a server, or vice versa.

Systems comprising one or more modules that perform, are operable to perform, or adapted to perform different method steps disclosed herein are also contemplated, where the modules are implemented using one or more machines listed herein or other suitable hardware.

Two things (e.g., modules or other features) may be coupled to each other when the two things are directly connected together (e.g., shown by a line or arrow connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a receiver or a server, may identify the following: the transmitter; the transmitter's location (LLA); pressure, temperature, humidity, and/or other conditions at or near the transmitter.

A receiver may be in the form of a computing device (e.g., a mobile phone, tablet, laptop, digital camera, tracking tag), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind, other), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

Transmission of signals, data and information between things (e.g., modules, components, etc.) may be carried out by means known in the art.

RELATED APPLICATIONS

This application relates to the following related application(s): U.S. Pat. Appl. No. 62/351,814, filed Jun. 17, 2016. The content of each of the related application(s) is hereby incorporated by reference herein in its entirety.

The invention claimed is:

1. A method for estimating an altitude of a receiver using building weather profile parameters, the method comprising:
    identifying one or more weather profile parameters for a building;
    determining an initial estimate of an altitude of a receiver at a floor inside the building; and
    using the initial estimate and the one or more weather profile parameters to determine a corrected estimate of the altitude of the receiver at the floor by:
        determining a first value by dividing a first product by a second product,
        wherein the first product is determined by multiplying an acceleration due to gravity, a molar mass of dry air, and a measured indoor pressure, and
        wherein the second product is determined by multiplying a universal gas constant and a reference outdoor temperature;
        determining a second value by multiplying the first value by the initial estimate of the altitude of the receiver;
        determining a third value by multiplying a first weather profile parameter, an inverted temperature difference and a second weather profile parameter;
        determining a difference of the second value and the third value;
        determining a fourth value by adding a third weather profile parameter to the difference;
        determining a third product by multiplying the first weather profile parameter and the inverted temperature difference;
        determining a fifth value by subtracting the third product from the first value; and
        determining the corrected estimate of the altitude of the receiver by dividing the fourth value by the fifth value.

2. The method of claim 1, wherein identifying the one or more weather profile parameters for the building comprises:
    determining indoor pressures at different altitudes of the building;
    determining indoor temperatures at the different altitudes of the building;
    for each of the different altitudes, determining a pressure difference between the determined indoor pressure and a corresponding outdoor pressure for that altitude;
    for each of the different altitudes, determining a temperature difference using the determined indoor temperature and a corresponding outdoor temperature for that altitude;
    storing the determined pressure differences and the determined temperature differences;
    generating the one or more weather profile parameters for the building using the determined pressure differences and the determined temperature differences; and
    storing the one or more weather profile parameters.

3. The method of claim 2, wherein the pressure differences and the temperature differences are determined by:
    determining an outdoor pressure;
    determining an outdoor temperature;
    for each of the different altitudes, determining the corresponding outdoor pressure for that altitude using the determined outdoor pressure; and
    for each of the different altitudes, determining the corresponding outdoor temperature for that altitude using the determined outdoor temperature.

4. The method of claim 2, wherein determining the pressure differences and the temperature differences comprises:
    determining a first indoor pressure and a first indoor temperature at a first altitude of the different altitudes when a first receiver is at the first altitude;
    determining an outdoor pressure and an outdoor temperature;
    generating, using the outdoor pressure and the first indoor pressure, an estimate of the first altitude;
    identifying an expected altitude of a first floor of the building at which the first receiver is located when the first receiver is at the first altitude;
    determining a first altitude difference between the expected altitude of the first floor and the estimate of the first altitude;
    using the first altitude difference to determine a first pressure difference between the first indoor pressure and a first outdoor pressure for the first altitude;
    determining a first outdoor temperature for the first altitude using the outdoor temperature;
    inverting the first indoor temperature and inverting the first outdoor temperature;
    determining a first temperature difference between the inverted first indoor temperature and the inverted first outdoor temperature;
    determining a second indoor pressure and a second indoor temperature at a second altitude of the different altitudes when a second receiver is at the second altitude;

generating, using the outdoor pressure or another outdoor pressure and the second indoor pressure, an estimate of the second altitude;

identifying an expected altitude of a second floor of the building at which the second receiver is located when the second receiver is at the second altitude;

determining a second altitude difference between the expected altitude of the second floor and the estimate of the second altitude;

using the second altitude difference to determine a second pressure difference between the second indoor pressure and a second outdoor pressure for the second altitude;

determining a second outdoor temperature for the second altitude using the outdoor temperature or another outdoor temperature;

inverting the second indoor temperature and inverting the second outdoor temperature; and determining a second temperature difference between the inverted second indoor temperature and the inverted second outdoor temperature.

5. The method of claim 4, wherein the first receiver and the second receiver are the same receiver.

6. The method of claim 2, wherein generating the one or more weather profile parameters for the building comprises:
generating a linear fit representing the determined pressure differences as a function of altitude;
estimating a plurality of fit parameters using the linear fit, wherein a first fit parameter represents the slope of the linear fit and a second fit parameter represents the y-intercept of the linear fit; and
determining the one or more weather profile parameters for the building using the plurality of fit parameters.

7. The method of claim 1, wherein the first weather profile parameter represents an amount of air that passes through a surface boundary of the building, the third weather profile parameter represents HVAC performance of the building, and the second weather profile parameter represents air leakage of the building as a function of the height of the building.

8. The method of claim 6, wherein identifying the one or more weather profile parameters for the building comprises:
identifying two or more sets of fit parameters, wherein each set of fit parameters includes the first fit parameter and the second fit parameter;
generating two or more ratios using the two or more sets of fit parameters and two or more temperature differences;
determining the first weather profile parameter by averaging the two or more ratios; and
determining the third weather profile parameter and the second weather profile parameter by fitting a line to a distribution of each of the two or more sets of fit parameters.

9. The method of claim 8, wherein the y-intercept of the fitted line corresponds to the third weather profile parameter, and the slope of the fitted line corresponds to the second weather profile parameter.

10. The method of claim 1, wherein identifying the one or more weather profile parameters for the building comprises:
determining an estimated position of the receiver;
identifying the building using the estimated position; and
identifying, after identifying the building, the one or more weather profile parameters from a database,
wherein the one or more weather profile parameters are stored in the database in association with one or more of a time, a date, an altitude, or a building identifier.

11. The method of claim 1, wherein determining an initial estimated altitude of a receiver inside the building comprises:
measuring an indoor pressure using a pressure sensor of the receiver when the receiver is at the floor;
determining outdoor pressure; and
determining the initial estimated altitude of the receiver using the measured indoor pressure and the determined outdoor pressure.

12. The method of claim 2, wherein each of the determined pressure differences and the determined temperature differences are stored in association with one or more of a time, a date, an altitude, or a building identifier.

13. One or more non-transitory machine-readable media embodying program instructions that, when executed by one or more machines, cause the one or more machines to implement a method for estimating an altitude of a receiver using building weather profile parameters, the method comprising:
identifying one or more weather profile parameters for a building;
determining an initial estimate of an altitude of a receiver at a floor inside the building; and
using the initial estimate and the one or more weather profile parameters to determine a corrected estimate of the altitude of the receiver at the floor by:
determining a first value by dividing a first product by a second product,
wherein the first product is determined by multiplying an acceleration due to gravity, a molar mass of dry air, and a measured indoor pressure, and
wherein the second product is determined by multiplying a universal gas constant and a reference outdoor temperature;
determining a second value by multiplying the first value by the initial estimate of the altitude of the receiver;
determining a third value by multiplying a first weather profile parameter, an inverted temperature difference and a second weather profile parameter;
determining a difference of the second value and the third value;
determining a fourth value by adding a third weather profile parameter to the difference;
determining a third product by multiplying the first weather profile parameter and the inverted temperature difference;
determining a fifth value by subtracting the third product from the first value; and
determining the corrected estimate of the altitude of the receiver by dividing the fourth value by the fifth value.

14. The one or more non-transitory machine-readable media of claim 13, wherein identifying the one or more weather profile parameters for the building comprises:
determining indoor pressures at different altitudes of the building;
determining indoor temperatures at the different altitudes of the building;
for each of the different altitudes, determining a pressure difference between the determined indoor pressure and a corresponding outdoor pressure for that altitude;
for each of the different altitudes, determining a temperature difference using the determined indoor temperature and a corresponding outdoor temperature for that altitude;

storing the determined pressure differences and the determined temperature differences;
generating the one or more weather profile parameters for the building using the determined pressure differences and the determined temperature differences; and
storing the one or more weather profile parameters.

15. The one or more non-transitory machine-readable media of claim 14, wherein the pressure differences and the temperature differences are determined by:
   determining an outdoor pressure;
   determining an outdoor temperature;
   for each of the different altitudes, determining the corresponding outdoor pressure for that altitude using the determined outdoor pressure; and
   for each of the different altitudes, determining the corresponding outdoor temperature for that altitude using the determined outdoor temperature.

16. The one or more non-transitory machine-readable media of claim 14, wherein determining the pressure differences and the temperature differences comprises:
   determining a first indoor pressure and a first indoor temperature at a first altitude of the different altitudes when a first receiver is at the first altitude;
   determining an outdoor pressure and an outdoor temperature;
   generating, using the outdoor pressure and the first indoor pressure, an estimate of the first altitude;
   identifying an expected altitude of a first floor of the building at which the first receiver is located when the first receiver is at the first altitude;
   determining a first altitude difference between the expected altitude of the first floor and the estimate of the first altitude;
   using the first altitude difference to determine a first pressure difference between the first indoor pressure and a first outdoor pressure for the first altitude;
   determining a first outdoor temperature for the first altitude using the outdoor temperature;
   inverting the first indoor temperature and inverting the first outdoor temperature;
   determining a first temperature difference between the inverted first indoor temperature and the inverted first outdoor temperature;
   determining a second indoor pressure and a second indoor temperature at a second altitude of the different altitudes when a second receiver is at the second altitude;
   generating, using the outdoor pressure or another outdoor pressure and the second indoor pressure, an estimate of the second altitude;
   identifying an expected altitude of a second floor of the building at which the second receiver is located when the second receiver is at the second altitude;
   determining a second altitude difference between the expected altitude of the second floor and the estimate of the second altitude;
   using the second altitude difference to determine a second pressure difference between the second indoor pressure and a second outdoor pressure for the second altitude;
   determining a second outdoor temperature for the second altitude using the outdoor temperature or another outdoor temperature;
   inverting the second indoor temperature and inverting the second outdoor temperature; and
   determining a second temperature difference between the inverted second indoor temperature and the inverted second outdoor temperature.

17. The one or more non-transitory machine-readable media of claim 16, wherein the first receiver and the second receiver are the same receiver.

18. The one or more non-transitory machine-readable media of claim 14, wherein generating the one or more weather profile parameters for the building comprises:
   generating a linear fit representing the determined pressure differences as a function of altitude;
   estimating a plurality of fit parameters using the linear fit, wherein a first fit parameter represents the slope of the linear fit and a second fit parameter represents the y-intercept of the linear fit; and
   determining the one or more weather profile parameters for the building using the plurality of fit parameters.

19. The one or more non-transitory machine-readable media of claim 13, wherein the first weather profile parameter represents an amount of air that passes through a surface boundary of the building, the third weather profile parameter represents HVAC performance of the building, and the second weather profile parameter represents air leakage of the building as a function of the height of the building.

20. The one or more non-transitory machine-readable media of claim 18, wherein identifying the one or more weather profile parameters for the building comprises:
   identifying two or more sets of fit parameters, wherein each set of fit parameters includes the first fit parameter and the second fit parameter;
   generating two or more ratios using the two or more sets of fit parameters and two or more temperature differences;
   determining the first weather profile parameter by averaging the two or more ratios; and
   determining the third weather profile parameter and the second weather profile parameter by fitting a line to a distribution of each of the two or more sets of fit parameters.

21. The one or more non-transitory machine-readable media of claim 20, wherein the y-intercept of the fitted line corresponds to the third weather profile parameter, and the slope of the fitted line corresponds to the second weather profile parameter.

22. The one or more non-transitory machine-readable media of claim 13, wherein identifying the one or more weather profile parameters for the building comprises:
   determining an estimated position of the receiver;
   identifying the building using the estimated position; and
   identifying, after identifying the building, the one or more weather profile parameters from a database, wherein the one or more weather profile parameters are stored in the database in association with one or more of a time, a date, an altitude, or a building identifier.

23. The one or more non-transitory machine-readable media of claim 13, wherein determining an initial estimated altitude of a receiver inside the building comprises:
   measuring an indoor pressure using a pressure sensor of the receiver when the receiver is at the floor;
   determining outdoor pressure; and
   determining the initial estimated altitude of the receiver using the measured indoor pressure and the determined outdoor pressure.

24. The one or more non-transitory machine-readable media of claim 14, wherein each of the determined pressure differences and the determined temperature differences are stored in association with one or more of a time, a date, an altitude, or a building identifier.

* * * * *